(12) United States Patent
Fu (10) Patent No.: US 12,483,358 B2
(45) Date of Patent: Nov. 25, 2025

(54) COMMUNICATION METHOD, COMMUNICATION DEVICE, ELECTRONIC DEVICE AND COMPUTER STORAGE MEDIUM

(71) Applicant: Beijing Xiaomi Mobile Software Co., Ltd., Beijing (CN)

(72) Inventor: Ting Fu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 329 days.

(21) Appl. No.: 18/002,817

(22) PCT Filed: Jul. 17, 2020

(86) PCT No.: PCT/CN2020/102807
§ 371 (c)(1),
(2) Date: Dec. 21, 2022

(87) PCT Pub. No.: WO2022/011711
PCT Pub. Date: Jan. 20, 2022

(65) Prior Publication Data
US 2023/0246748 A1  Aug. 3, 2023

(51) Int. Cl.
*H04L 1/18* (2023.01)
*H04L 1/1812* (2023.01)
*H04L 1/1829* (2023.01)
*H04L 1/1867* (2023.01)

(52) U.S. Cl.
CPC .......... *H04L 1/1854* (2013.01); *H04L 1/1812* (2013.01); *H04L 1/1887* (2013.01)

(58) Field of Classification Search
CPC ... H04L 1/1854; H04L 1/1812; H04L 1/1887; H04L 1/1896; H04L 5/0023; H04L 5/0055; H04L 5/0091; Y02D 30/70
See application file for complete search history.

(56) References Cited

U.S. PATENT DOCUMENTS 12,107,685 B2 * 10/2024 Gou ................. H04L 1/1864
2020/0120701 A1   4/2020 Peng et al.
2020/0313803 A1 * 10/2020 Khoshnevisan ...... H04L 1/1812

FOREIGN PATENT DOCUMENTS

CN    110535587 A   12/2019
CN    110972302 A   4/2020

(Continued)

OTHER PUBLICATIONS

Xiaomi, HARQ enhancement for NR-U, 3GPP TSG RAN WG1 Meeting #95, Spokane, USA, R1-1813365, 3 pages, Nov. 12-16, 2018.*

(Continued)

*Primary Examiner* — Frank Duong
(74) *Attorney, Agent, or Firm* — Finnegan, Henderson, Farabow, Garrett & Dunner, L.L.P.

(57) ABSTRACT

A communication method, includes: receiving first configuration information, wherein the first configuration information includes a set of feedback delay indication values for a hybrid automatic repeat request acknowledgment, the set of feedback delay indication values is a subset of a set of candidate feedback delay indication values for the hybrid automatic repeat request acknowledgment, and the set of candidate feedback delay indication values includes an integer greater than 15.

17 Claims, 3 Drawing Sheets

(56) References Cited

FOREIGN PATENT DOCUMENTS

| WO | WO 2019242711 A1 | 12/2019 |
|---|---|---|
| WO | 2020227131 A1 | 11/2020 |

OTHER PUBLICATIONS

Examination report for Indian Application No. 202347006808, issued on May 2, 2023, 6 pages.
International Search Report of International Application No. PCT/CN2020/102807, mailed Apr. 6, 2021, 8 pages.
Extended European Search Report issued in Application No. 20945315.8 dated Mar. 6, 2024, 7 pages.
Huawei, HiSilicon, "HARQ enhancements in NR unlicensed", 3GPP TSG RAN WG1 Ad-Hoc Meeting 1901, R1-1900062, Taipei, Jan. 21-25, 2019, 11 pages.
Extended European Search Report Issued in Application No. 20945315.8 dated Aug. 6, 2025, 7 pages.

\* cited by examiner

FIG. 1

Receive first configuration information, in which the first configuration information includes a set of feedback delay indication values for a hybrid automatic repeat request acknowledgment (HARQ-ACK), the set of feedback delay indication value is a subset of a set of candidate feedback delay indication values for the HARQ-ACK, and the set of candidate feedback delay indication values includes an integer greater than 15 ⎬ S210

COMMUNICATION METHOD, COMMUNICATION DEVICE, ELECTRONIC DEVICE AND COMPUTER STORAGE MEDIUM

CROSS-REFERENCE TO RELATED APPLICATION

This application is a National Stage Application of International Application No. PCT/CN2020/102807, filed on Jul. 17, 2020, the entire content of which is incorporated herein by reference.

TECHNICAL FIELD

Embodiments of the present disclosure relate to the field of wireless communication, and more particularly to a communication method, a communication device, an electronic device and a computer storage medium.

BACKGROUND

In the 5G New Radio (NR) protocol, a base station may schedule downlink data to be transmitted on a physical downlink shared channel (PDSCH) in a certain slot n through downlink control information (DCI), and indicate user equipment (UE) to feedback hybrid automatic repeat request acknowledgement (HARQ-ACK) information on a physical uplink control channel (PUCCH) in a slot n+k1 in the scheduled DCI. When the scheduled DCI is DCI 1-1, a k1 set is configured by radio resource control (RRC) layer parameters. The base station may arbitrarily select eight numbers from sixteen numbers of 0 to 15, and configure the eight numbers as the k1 set. For example, the k1 set is configured as $\{1, 3, 5, 7, 9, 11, 12, 14\}$. The DCI 1-1 is a non-fallback DCI format and is configured to schedule downlink data for the UE after the UE acquires proprietary RRC configuration parameters. The k1 value represents a feedback delay of the HARQ-ACK, that is, a terminal receives the PDSCH in the slot n, and sends the HARQ-ACK corresponding to the PDSCH on the PUCCH in the slot n+k1, in which case, the terminal is required to complete demodulation of the PDSCH and generation of the HARQ-ACK information in the k1 slot. In the current protocol, a maximum value of k1 is 15.

SUMMARY

In one aspect, a communication method is provided. The communication method includes: receiving first configuration information. The first configuration information includes a set of feedback delay indication values for a hybrid automatic repeat request acknowledgment (HARQ-ACK), the set of feedback delay indication values is a subset of a set of candidate feedback delay indication values for the HARQ-ACK, and the set of candidate feedback delay indication values includes an integer greater than 15.

In another aspect, a communication method is provided. The communication method includes: determining a set of feedback delay indication values from a set of candidate feedback delay indication values for a hybrid automatic repeat request acknowledgment (HARQ-ACK), the set of candidate feedback delay indication values including an integer greater than 15; and sending first configuration information, the first configuration information including the set of feedback delay indication values.

In another aspect, an electronic device is provided. The electronic device includes a processor and a memory storing a computer program executable by the processor. The processor executes the program to perform a communication method. The communication method includes: receiving first configuration information. The first configuration information includes a set of feedback delay indication values for a hybrid automatic repeat request acknowledgment (HARQ-ACK), the set of feedback delay indication values is a subset of a set of candidate feedback delay indication values for the HARQ-ACK, and the set of candidate feedback delay indication values includes an integer greater than 15.

BRIEF DESCRIPTION OF THE DRAWINGS

The above and/or additional aspects and advantages in embodiments of the present disclosure will become obvious and easy to understand from the following description of the embodiments in conjunction with the accompanying drawings.

DETAILED DESCRIPTION

Embodiments of the present disclosure are described in detail below, and examples of embodiments are illustrated in the accompanying drawings, in which the same or similar labels represent the same or similar elements or elements with the same or similar functions. The embodiments described below with reference to the drawings are exemplary, are only configured to explain the present disclosure and are not constituted as a limitation of the present disclosure.

Those skilled in the art may understand that the singular forms "a", "an", "said" and "the" as used herein may also include plural forms unless specifically stated. It should be further understood that the expression "comprising" used herein refers to the presence in which features, integers, steps, operations, elements and/or components, but does not preclude the presence or addition of one or more other features, integers, steps, operations, elements, components, and/or their groups. It should be understood that, when the element is referred to as "connected" or "coupled" to another element, it may be directly connected or coupled to other elements or there may be an intermediate element. In addition, "connected" or "coupled" used herein may include wireless connection or wireless coupling. The term "and/or" used herein includes any or all units and all combinations of one or more associated items.

At present, an established NR protocol is only used in a working frequency below 52.6 GHz, and an optional sub-carrier spacing (SCS) may be 15 kHz, 30 kHz, 60 kHz, 120 kHz, and the like. When the SCS is 15 kHz, a duration of one slot is 1 ms (millisecond), and when the SCS is 30 kHz, a duration of one slot is 0.5 ms, and when the SCS is 60 kHz, a duration of one slot is 0.25 ms, and so on. It can be seen that the larger the SCS is, the shorter the duration of one slot is.

In a high-band communication protocol currently being discussed, for example, in a high band of about 60 GHz, in order to cope with phase noise, a larger sub-carrier band-width is generally selected, for example, 960 KHz. When the SCS is 960 kHz, the duration of one slot is 0.015625 ms, that is, 1/64 ms.

In a high-band communication system, for example, when the SCS is 960 kHz, the duration of one slot is far below 1 ms, for example, 0.015625 ms. Since a maximum value of a feedback delay k1 of a current HARQ-ACK is 15, that is, 16 slots, the corresponding duration is 16*0.015625=0.25 ms, however, the data processing capability of UE may not complete demodulation of a PDSCH and generation of HARQ-ACK information in 16 slots, when the duration of one slot is far below 1 ms, it has become an urgent problem to be solved how to configure and determine a feedback delay of the HARQ-ACK information.

In order to understand and explain the solution in embodiments of the present disclosure, some technical terms involved in embodiments of the present disclosure are briefly described below:
ACK: Acknowledgment;
DCI: Downlink Control Information;
HARQ-ACK: Hybrid Automatic Repeat request acknowledgment;
NR: New Radio;
PDSCH: Physical Downlink Shared channel;
Slot: Time Slot;
RRC: Radio Resource Control.

To make the purposes, technical solutions and advantages of embodiments of the present disclosure more clear, the embodiments of the present disclosure will be further described below in combination with the accompanying drawings.

The technical solutions in embodiments of the present disclosure and how the technical solutions in embodiments of the present disclosure solve the above technical problems are described below in embodiments. The following several embodiments may be combined with each other, and same or similar concepts or processes may not be repeated in some embodiments. The embodiments of the present disclosure will be described in combination with the accompanying drawings.

Figure 1:
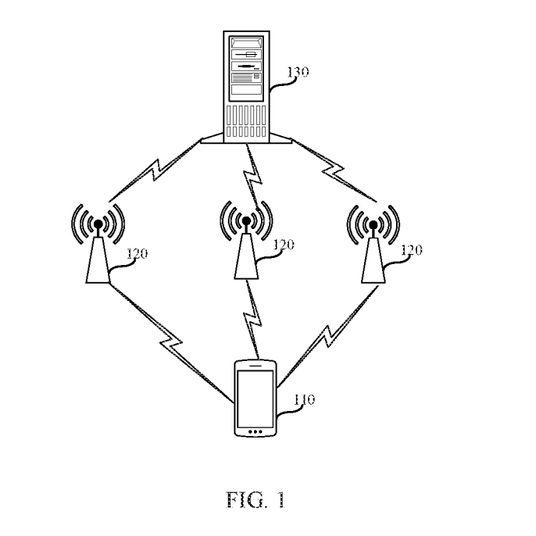
FIG. 1 is a diagram illustrating a structure of a wireless communication system in embodiments of the present disclosure.

FIG. 1 is a diagram illustrating a structure of a wireless communication system in an example. As illustrated in FIG. 1, the mobile communication system may include several user equipment (UE) 110 and several base stations 120.

The UE 110 may communicate with one or more core networks for communication via a radio access network (RAN). The UE 110 may refer to equipment that provides voice and/or data connectivity for a user, such as a smart phone, a tablet computer, a smart watch, etc. The UE 110 may be an IoT (internet of things) apparatus, such as a sensor apparatus, a mobile phone (or referred to as a "cellular" phone) and a computer having an IoT terminal, for example, a fixed, portable, compact, handheld, computer built-in or vehicle-mounted device, as another example, a mobile station, a mobile, a remote station, an access point, a remote terminal, an access terminal, etc., which will not be limited in the embodiments of the present disclosure.

The base station 120 may be a network side device in a wireless communication system. The wireless communication system may be a 5G system, also referred to as a 5G new radio (NR) system. Alternatively, the wireless communication system may be a next generation system of a 5G system.

The base station 120 may be a base station (gNB) with a centralized distributed architecture in a 5G system. When the centralized distributed architecture is adopted, the base station 120 generally includes a central unit (CU) and at least two distributed units (DU). A protocol stack of a packet data convergence protocol (PDCP) layer, a radio link control (RLC) layer and a media access control (MAC) layer is configured in the CU: and a physical (PHY) layer protocol stack is configured in the DU. The specific implementation of the base station 120 is not limited in embodiments of the disclosure.

The base station 120 may establish a wireless connection with the UE 110 through a radio interface. In different implementations, the radio interface is a radio interface based on a 5G standard, and for example, the radio interface is a new radio interface; alternatively, the radio interface may be a radio interface based on a next generation mobile communication network technology standard of the 5G.

In addition, the wireless communication system further may include a network management device 130. The several base stations 120 may be coupled to a network management device 130. The network management device 130 may be a core network device in a wireless communication system, for example, the network management device 130 may be a mobility management entity (MME) in an evolved packet core (EPC). The network management device may be other core network devices, which is not limited in embodiments of the present disclosure.

Figure 2:
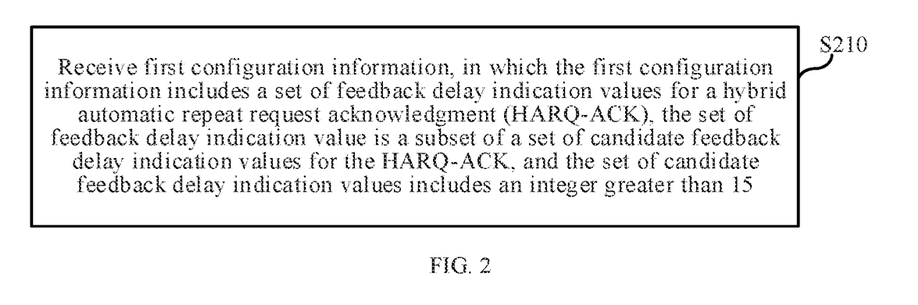
FIG. 2 is a flowchart illustrating a communication method in an embodiment of the present disclosure.

A communication method is provided in embodiments of the present disclosure. The method is applied to a wireless communication system as illustrated in FIG. 1 and is performed by the UE 110 as illustrated in FIG. 1. As illustrated in FIG. 2, the method includes:

in step S210, receiving first configuration information. The first configuration information includes a set of feedback delay indication values for a hybrid automatic repeat request acknowledgment (HARQ-ACK). The set of feedback delay indication value is a subset of a set of candidate feedback delay indication values for the HARQ-ACK. The set of candidate feedback delay indication values includes an integer greater than 15.

At present, the subcarrier spacing (SCS) of the UE may be 15 kHz, 30 kHz, 60 kHz, 120 kHz, etc. The value range of the feedback delay indication values for the HARQ-ACK (denoted as k1) includes sixteen numbers of 0 to 15, that is, an original set of candidate feedback delay indication values for the HARQ-ACK includes sixteen numbers of 0 to 15. The network side device (such as a base station) may arbitrarily select a value of a certain number (such as 8) from the sixteen numbers of 0 to 15 and configure the certain number as a k1 set (that is, a set of feedback delay indication values), for example, the k1 set is {1, 3, 5, 7, 9, 11, 12, 14}, and send the k1 set to corresponding UE, so that the UE may send the HARQ-ACK corresponding to the PDSCH on the PUCCH in a slot n+k1 when receiving the PDSCH in a slot n.

When the UE is in a high band, in order to cope with phase noise, a larger SCS is generally selected, for example, 240 KHz, 480 KHz, 960 KHz, that is, the SCS of the UE further may be 240 KHz, 480 KHz, 960 KHz in addition to 15 KHz, 30 KHz, 60 KHz and 120 KHz, that is, the SCS of the UE is X times of 15 KHz, in which, X is $2^M$, and M is a natural number. When the SCS of the UE is larger, for example, 960 kHz, the duration of one slot is far below 1 ms. In this case, since the maximum value of the original set of candidate feedback delay indication values (the value range of 0~15) is 15, the maximum value in the k1 set is 15, so that the UE cannot effectively complete demodulation of the PDSCH and generation of the HARQ-ACK information in any k1 number of slots in the k1 set (that is, in k1 slots).

In addition, since data processing capabilities (such as data receiving capabilities, data sending capabilities, data demodulation capabilities and data generation capabilities, etc.) of different UEs are different, durations required for the UEs to complete demodulation of the PDSCH and generation of the HARQ-ACK information are different.

On that basis, the value range of k1 may be updated to a larger set, so that the maximum value k1 may be configured greater than 15, for example, the value range of k1 is updated from the original 0~15 to 0~L, in which, L is an integer greater than 15. That is, the original set of candidate feedback delay indication values for the HARQ-ACK is updated to a new set of candidate feedback delay indication values, and the new set of candidate feedback delay indication values includes L+1 numbers of 0~L, that is, the new set of candidate feedback delay indication values includes an integer greater than 15. For ease of description, the new set of candidate feedback delay indication values is referred to as a set of candidate feedback delay indication values for the HARQ-ACK.

The value range of k1 is updated to a larger set, so that the maximum value k1 may be configured is greater than 15, thereby providing the UE with more slots for demodulation of the PDSCH and generation of the HARQ-ACK information, increasing the duration of the feedback delay of the UE, and ensuring that the UE may effectively complete demodulation of the PDSCH and generation of the HARQ-ACK information.

In an example, the value of L may be 127, that is, the value range of k1 is updated to 0~127, that is, the set of candidate feedback delay indication values is 0~127. In another example, the value of L may be 255, that is, the value range of k1 is updated to 0~255, that is, the set of candidate feedback delay indication values is 4~255.

In actual application, the value of L may be determined based on a maximum feedback delay required by the UE. Assume that the maximum feedback delay is 2 ms, and the SCS is %0 KHz, when the SCS is 960 KHz, a duration length of one slot is 0.015625 ms, i.e., 1/64 ms, and the number of slots corresponding to the 2 ms maximum feedback delay is 128, in which case, the value of L is 127, that is, the set of candidate feedback delay indication values is 0~127. Assume that the maximum feedback delay is 2 ms, and the SCS is 480 KHz, when the SCS is 480 KHz, the duration length of one slot is 0.03125 ms, that is, 1/32 ms, and, the number of slots corresponding to the 2 ms maximum feedback delay is 64. In this case, the value of L is 63, that is, the set of candidate feedback delay indication values for the HARQ-ACK is 0~63.

That is, the value of L may be determined based on the maximum feedback delay required by the SCS and the UE, and further the set of candidate feedback delay indication values for the HARQ-ACK may be determined. The value range of k1 may be uniformly set for all SCSs, for example, when the SCS is not greater than 960 kHz, the value range of k1 is 0~127, that is, the set of candidate feedback delay indication values is uniformly set for different SCSs; and corresponding value ranges of k1 may be set for different SCSs, for example, when the SCS is 240 kHz or above, the value range of k1 is 8~31, as another example, when the SCS is 480 kHz or above, the value range of k1 is 16~63, and as another example, when the SCS is %0 kHz or above, the value range of K1 is 32~127.

When the set of candidate feedback delay indication values for the HARQ-ACK is determined, the base station may select a corresponding number of feedback delay indication values for each UE from the set of candidate feedback delay indication values for the HARQ-ACK as a set of feedback delay indication values. That is, the base station configures a corresponding set of feedback delay indication values for the HARQ-ACK for each UE based on the set of candidate feedback delay indication values for the HARQ-ACK. The set of feedback delay indication values is subset of the set of candidate feedback delay indication values for the HARQ-ACK.

It needs to be noted that, the corresponding set of feedback delay indication values the base station selects for each UE may be one or more. When the set of candidate feedback delay indication values is one, it represents that related information of all UEs corresponds to a unified set of candidate feedback delay indication values; when the set of candidate feedback delay indication values is more, at least one of a plurality of sets of candidate feedback delay indication values is an integer greater than 15. In this case, the related information of each UE corresponds to a set of candidate feedback delay indication values; for one UE, w % ben the set of feedback delay indication values is determined, a corresponding set of candidate feedback delay indication values may be selected from the plurality of sets of candidate feedback delay indication values based on the related information of the UE, and a corresponding set of feedback delay indication values may be selected from the corresponding set of candidate feedback delay indication values.

When the base station determines the set of feedback delay indication values from the set of candidate feedback delay indication values for the HARQ-ACK, the determined set of feedback delay indication values may be sent to the corresponding UE based on the corresponding configuration information sent to the UE (that is, the above first configuration information). The first configuration information includes the determined set of feedback delay indication values. Correspondingly, the UE receives the first configuration information sent by the base station; the first configuration information includes a set of feedback delay indication values for the HARQ-ACK. The set of feedback delay indication value is subset of a set of candidate feedback delay indication values for the HARQ-ACK, and the set of candidate feedback delay indication values includes an integer greater than 15.

In actual applications, the first configuration information may be RRC signaling information, that is, the base station selects a corresponding number of feedback delay indication values for each UE from the set of candidate feedback delay indication values for the HARQ-ACK through the RRC signaling, and sends the corresponding number of feedback delay indication values to the corresponding UE through the RRC signaling. Correspondingly, the UE receives RRC signaling information sent by the base station.

In the communication method provided in embodiments of the present disclosure, the set of candidate feedback delay indication values includes an integer greater than 15, so that the feedback delay indication value in the set of feedback delay indication values may be set to a numerical value greater than 15, thereby providing the UE with more slots for demodulation of the PDSCH and generation of the HARQ-ACK information, increasing the duration of the feedback delay of the UE, and ensuring that the UE may effectively complete demodulation of the PDSCH and generation of the HARQ-ACK information.

In an optional embodiment, the set of candidate feedback delay indication values includes sets of candidate feedback delay indication values corresponding to related information of different UEs, that is, different sets of candidate feedback delay indication values may be configured, and the different sets of candidate feedback delay indication values may correspond to related information of different UEs, in which case, at least one of the plurality of sets of candidate feedback delay indication values is an integer greater than 15; the set of feedback delay indication values is a subset of the set of candidate feedback delay indication values corresponding to the related information of the UE. Alternatively, the set of candidate feedback delay indication values includes subsets of candidate feedback delay indication values corresponding to related information of different UEs: the set of feedback delay indication values is a subset of the subset of candidate feedback delay indication values corresponding to the related information of the UE.

The related information includes at least one of: a subcarrier spacing (SCS) of an uplink active carrier of the UE; a subcarrier spacing (SCS) of a downlink active carrier of the UE; and capability information of the UE.

The capability information of the UE is information capable of directly or indirectly reflecting or representing the communication capability or the data processing capability (including the capability of receiving data, the capability of sending data, the capability of parsing data, etc.) of the UE, including but not limited to a type of the UE, a number of antennas of the UE, channel quality of the UE, etc. The type of the UE type includes a common UE, NR-Lite, etc., and NR-Lite is a reduced capability UE, and may be simply referred to as simplified new radio.

In one case, the set of candidate feedback delay indication values may be uniformly set for related information of different UEs. For example, when the SCS of the UE uplink active carrier and/or the SCS of the UE downlink active carrier is 15 kHz, 30 kHz, 60 kHz, 120 kHz, 240 kHz, 480 kHz, 960 kHz, etc., the set of candidate feedback delay indication values is 128 numbers of 0~127, as another example, when the capability information of the UE is stronger, the set of candidate feedback delay indication values is 64 numbers of 0~63, and when the capability information of the UE is weaker, the set of candidate feedback delay indication values is also 64 numbers of 0~63, as another example, no matter how much kHz the SCS of the UE uplink active carrier and the SCS of the UE downlink active carrier are respectively, or regardless of the strength of the capability information of the UE, the set of candidate feedback delay indication values is 128 numbers of 0~127.

In another case, the related information of UE may correspond to a set of candidate feedback delay indication values, that is, different related information correspondingly has corresponding sets of candidate feedback delay indication values, in which case, the set of feedback delay indication values of the UE is a subset of the set of candidate feedback delay indication values corresponding to the related information of the UE.

For example, when the SCS of the UE uplink active carrier and/or the SCS of the UE downlink active carrier for the UE_1 is less than or equal to 120 kHz, the candidate feedback delay indication value may be sixteen numbers of 0~15, in which case, the set of candidate feedback delay of the UE_1 is 10 numbers of 0~15. As another example, when the SCS of the UE uplink active carrier and/or the SCS of the UE downlink active carrier for the UE_2 is 480 kHz or above, and when the capability information of the UE_2 is stronger, the candidate feedback delay indication values may be 32 numbers of 0~31, in which case, the set of candidate feedback delay of the UE_2 is 32 numbers of 0~31.

It needs to be noted that, in addition to the set of candidate feedback delay indication values in the above example, related information of different UEs further may correspond to other sets of candidate feedback delay indication values, which are not limited in embodiments of the present disclosure.

In another case, the set of candidate feedback delay indication values may be regarded as a set of subsets of candidate feedback delay indication values corresponding to related information of different UEs, that is, the set of candidate feedback delay indication values includes subsets of candidate feedback delay indication values corresponding to related information of different UEs. In this case, the related information of different UEs respectively has corresponding subsets of candidate feedback delay indication values. For example, when the SCS of the UE uplink active carrier and/or the SCS of the UE downlink active carrier is less than or equal to 120 kHz, the subset of candidate feedback delay indication values is sixteen numbers of 0~15; as another example, when the SCS of the UE uplink active carrier and/or the SCS of the UE downlink active carrier is 240 kHz or above, the subset of candidate feedback delay indication values is 24 numbers of 8~31, and when the SCS of the UE uplink active carrier and/or the SCS of the UE downlink active carrier is 480 kHz or above, the subset of candidate feedback delay indication values is 48 numbers of 16~63, and when the SCS of the UE uplink active carrier and/or the SCS of the UE downlink active carrier is %0 kHz or above, the subset of candidate feedback delay indication values is 96 numbers of 32~127; as another example, when the capability information of the UE is stronger, the candidate feedback delay indication values may be 48 numbers of 0~47, and when the capability information of the UE is weaker, the candidate feedback delay indication values may be 48 numbers of 48~63; as another example, when the SCS of the UE uplink active carrier and/or the SCS of the UE downlink active carrier is 240 kHz or above, and the capability information of the UE is stronger, the subset of candidate feedback delay indication values may be sixteen numbers of 0~-15; as another example, when the SCS of the UE uplink active carrier and/or the SCS of the UE downlink active carrier is 120 kHz or below, and the capability information of the UE is weaker, the subset of candidate feedback delay indication values may be 24 numbers of 8~31.

It needs to be noted that, in addition to possible subsets of candidate feedback delay indication values given in the above example, related information of different UEs may further correspond to other subsets of candidate feedback delay indication values, which are not limited in embodiments of the disclosure.

In one scenario, in the process that the base station configures a corresponding set of feedback delay indication values for each UE based on the set of candidate feedback delay indication values, in case that the set of candidate feedback delay indication values is uniformly set for related information of different UEs, the base station may respectively select a corresponding number of feedback delay indication values for each UE from the set of candidate feedback delay indication values based on the related information of each UE, that is, respectively configure a corresponding set of feedback delay indication values for each UE based on the related information of each UE. Correspondingly, the set of feedback delay indication values received by the UE is a subset corresponding to the related information of the UE in the set of candidate feedback delay indication values.

In an example, in case that the set of candidate feedback delay indication values is 128 numbers of 0~127, when the SCS of the UE uplink active carrier and/or the SCS of the UE downlink active carrier for any one UE (for example, a UE_1) is 960 KHz, the base station may select a certain number (for example, 8) of feedback delay indication values from the set of candidate feedback delay indication values 0~127 and configure the certain number of feedback delay indication values as a set of feedback delay indication values of the UE_1, for example, the set of feedback delay indication values of the UE_1 may be configured {71, 79, 87, 95, 103, 111, 119, 127}, and correspondingly, the set of feedback delay indication values received by the UE_1 is a subset {71, 79, 87, 95, 103, 111, 119, 127} corresponding to the related information of the UE in the set of candidate feedback delay indication values.

In another example, assume that the set of candidate feedback delay indication values is 64 numbers of 0~63, when the SCS of the UE uplink active carrier and/or the SCS of the UE downlink active carrier for any one UE (for example, a UE_2) is 15 KHz, the base station may select a certain number (for example, 8) of feedback delay indication values from the set of candidate feedback delay indication values 0~63 and configure the certain number of feedback delay indication values as a set of feedback delay indication values of the UE_2, for example, the set of feedback delay indication values of the UE_2 may be configured {0, 1, 2, 3, 4, 5, 6, 7}, and correspondingly, the set of feedback delay indication values received by the UE_2 is a subset {0, 1, 2, 3, 4, 5, 6, 7} corresponding to the related information of the UE in the set of candidate feedback delay indication values.

In another scenario, in the process that the base station configures a corresponding set of feedback delay indication values for each UE based on the set of candidate feedback delay indication values, in case that the set of candidate feedback delay indication values includes sets of candidate feedback delay indication values respectively corresponding to the related information of different UEs, the base station may determine sets of candidate feedback delay indication values respectively corresponding to each UE based on the related information of each UE, and determine a set of feedback delay indication values from the corresponding set of candidate feedback delay indication values. Correspondingly, the set of feedback delay indication values received by the UE is a subset of the set of candidate feedback delay indication values corresponding to the related information of the UE. Consequently, a matched set of candidate feedback delay indication values may be dynamically selected based on the related information of the UE, which not only increases the flexibility of configuring the set of feedback delay indication values of the UE, but also ensures that the configured set of feedback delay indication values may match the related information of the UE well and satisfy the requirement of the UE for the feedback delay.

In an example, in case that each UE is a UE_1 and a UE_2, respectively, and the set of each candidate feedback delay indication value is C1 and C2, respectively, first, the base station determines a set of candidate feedback delay indication values corresponding to the each UE based on related information of the UEs (that is, the UE_1 and the UE_2), for example, the set of candidate feedback delay indication values corresponding to the UE_1 is C1, and the set of candidate feedback delay indication values corresponding to the UE_2 is C2. The base station determines a corresponding set of feedback delay indication values for each UE from the set of candidate feedback delay indication values corresponding to each UE, for example, selects a certain number of feedback delay indication values from the set of candidate feedback delay indication values C1 corresponding to the UE_1 as a set of feedback delay indication values of the UE_1, and selects a certain number of feedback delay indication values from the subset of candidate feedback delay indication values C2 corresponding to the UE_2 as a set of feedback delay indication values of the UE_2.

Correspondingly, the set of feedback delay indication values received by the UE_1 is a subset of the set of candidate feedback delay indication values C1 corresponding to the related information of the UE_1, and the set of feedback delay indication values received by the UE_2 is a subset of the set of candidate feedback delay indication values C2 corresponding to the related information of the UE_2.

In another scenario, in the process that the base station configures a corresponding set of feedback delay indication values for each UE based on the set of candidate feedback delay indication values, in case that the set of candidate feedback delay indication values is a set of subsets of candidate feedback delay indication values respectively corresponding to the related information of different UEs, the base station may determine subsets of candidate feedback delay indication values respectively corresponding to each UE based on the related information of each UE, and determine a set of feedback delay indication values from the corresponding subset of candidate feedback delay indication values. Correspondingly, the set of feedback delay indication values received by the UE is a subset of the subset of candidate feedback delay indication values corresponding to the related information of the UE. Consequently, a matched subset of candidate feedback delay indication values may be dynamically selected based on the related information of the UE, which not only increases the flexibility of configuring the set of feedback delay indication values of the UE, but also ensures that the configured set of feedback delay indication values may match the related information of the UE well and satisfy the requirement of the UE for the feedback delay.

In an example, in case that each UE is a UE_1, a UE_2, a UE_3 and a UE_4, respectively, and the set of each candidate feedback delay indication value is C1, C2 and C3, respectively, first, the base station determines a subset of candidate feedback delay indication values corresponding to the each UE based on the related information of the each UE (that is, the UE_1, the UE_2, the UE_3 and the UE_4), for example, the subset of candidate feedback delay indication values corresponding to the UE_1 is C1 (for example, 48 numbers of 16~63), the subset of candidate feedback delay indication values corresponding to the UE_2 is C4, the subset of candidate feedback delay indication values corresponding to the UE_3 is C1 and the subset of candidate feedback delay indication values corresponding to the UE_4 is C3.

Then, the base station determines a corresponding set of feedback delay indication values for each UE from the set of candidate feedback delay indication values corresponding to the each UE, for example, selects a certain number of feedback delay indication values from the subset of candidate feedback delay indication values C1 corresponding to the UE_1 as a set of feedback delay indication values of the UE_1, for example, the set of feedback delay indication values of the UE_1 is {16, 22, 28, 24, 40, 46, 52, 58}, and selects a certain number of feedback delay indication values from the subset of candidate feedback delay indication values C4 corresponding to the UE_2 as a set of feedback delay indication values of the UE_2, selects a certain number of feedback delay indication values from the subset of candidate feedback delay indication values C1 corresponding to the UE_3 as a set of feedback delay indication values of the UE_3, and selects a certain number of feedback delay indication values from the subset of candidate feedback delay indication values C3 corresponding to the UE_4 as a set of feedback delay indication values of the UE_4.

Correspondingly, the set of feedback delay indication values received by the UE_1 is a subset of the subset of candidate feedback delay indication values C1 corresponding to the related information of the UE_1 (for example, {16, 22, 28, 24, 40, 46, 52, 58}), the set of feedback delay indication values received by the UE_2 is a subset of the subset of candidate feedback delay indication values C4 corresponding to the related information of the UE_2, the set of feedback delay indication values received by the UE_3 is a subset of the subset of candidate feedback delay indication values C1 corresponding to the related information of the UE_3, and the set of feedback delay indication values received by the UE_4 is a subset of the subset of candidate feedback delay indication values C3 corresponding to the related information of the UE_4.

In an alternative embodiment, a number of feedback delay indication values in the set of feedback delay indication values corresponds to the related information of the UE. The related information includes at least one of: a subcarrier spacing (SCS) of an uplink active carrier of the UE: a subcarrier spacing (SCS) of a downlink active carrier of the UE: and capability information of the UE.

In the process that the base station configures a corresponding set of feedback delay indication values for each UE based on the set of candidate feedback delay indication values, a number of feedback delay indication values corresponding to the each UE may be determined based on the related information of the each UE, and further a set of feedback delay indication values corresponding to the each UE is determined. In other words, the number of feedback delay indication values in the set of feedback delay indication values of the UE corresponds to the related information of the UE.

That is, the base station determines a set of feedback delay indication values corresponding to each UE and a corresponding number of feedback delay indication values included in the set of feedback delay indication sets of the each UE based on the related information of the each UE, so that the set of feedback delay indication values of the UE may be dynamically selected based on the related information of the UE, which not only increases the flexibility of configuring the set of feedback delay indication values of the UE, but also ensures that the configured set of feedback delay indication values may match the related information of the UE well and satisfy the requirement of the UE for the feedback delay.

In an example, assume that each UE is a UE_1, a UE_2 and a UE_3, respectively, when the base station configures a corresponding set of feedback delay indication values for each UE, a first number of feedback delay indication values may be selected for the UE_1 from the set of candidate feedback delay indication values based on the related information of the UE_1, that is, the set of feedback delay indication values of the UE_1 includes the first number of feedback delay indication values: similarly, a second number of feedback delay indication values may be selected for the UE_2 from the set of candidate feedback delay indication values based on the related information of the UE_2, that is, the set of feedback delay indication values of the UE_2 includes the second number of feedback delay indication values; similarly, a third number of feedback delay indication values may be selected for the UE_3 from the set of candidate feedback delay indication values based on the related information of the UE_3, that is, the set of feedback delay indication values of the UE_3 includes the third number of feedback delay indication values.

The quantities of feedback delay indication values in the sets of feedback delay indication values corresponding to related information of different UEs may be same or different, that is, the first number and the second number may be same or different, and the second number and the third number may be same or different. In an example, the first number and the second number may be same, and the second number and the third number may be different; in another example, the first number and the third number may be same, and the second number and the third number may be different.

In a specific example, for example, when the SCS of the UE uplink active carrier and/or the SCS of the UE downlink active carrier for the UE_1 and the UE_2 are 15 KHz to 120 KHz, the base station may select eight feedback delay indication values from the set of candidate feedback delay indication values for the UE_1 and the UE_2, respectively. As another example, when the SCS of the UE uplink active carrier and/or the SCS of the UE downlink active carrier for the UE_3 is 240 KH to 960 KHz, the base station may select sixteen feedback delay indication values from the set of candidate feedback delay indication values for the UE_3.

In another example, for example, when the SCS of the UE uplink active carrier and/or the SCS of the UE downlink active carrier for the UE_1 is 480 KHz, and the capability information of the UE_1 is stronger, the base station may select three feedback delay indication values from the set of candidate feedback delay indication values for the UE_1. As another example, when the SCS of the UE uplink active carrier and/or the SCS of the UE downlink active carrier for the UE_2 is 480 KHz, and the capability information of the UE_2 is weaker, the base station may select eight feedback delay indication values from the set of candidate feedback delay indication values for the UE_1.

It needs to be noted that, the processing process that the base station selects the corresponding number of feedback delay indication values from the subset of candidate feedback delay indication values based on the related information of the UE is similar to the processing process that the base station selects the corresponding number of feedback delay indication values from the set of candidate feedback delay indication values based on the related information of the UE, which will not be repeated here.

In an alternative embodiment, the UE further executes the processings: determining a target feedback delay indication value based on the set of feedback delay indication values; and sending the HARQ-ACK based on the target feedback delay indication value.

When the UE receives the set of feedback delay indication values for the HARQ-ACK sent by the base station, since the set of feedback delay indication values includes one or more feedback delay indication values, the UE needs to determine one feedback delay indication value from the one or more feedback delay indication values included in the set of feedback delay indication values when receiving the set of feedback delay indication values as a target feedback delay indication value of the UE, and sends a corresponding HARQ-ACK to the base station based on the target feedback delay indication value of the UE.

Correspondingly, the base station receives the HARQ-ACK sent by the UE based on the target feedback delay indication value. The target feedback delay indication value is determined by the UE from the set of feedback delay indication values.

In an alternative embodiment, the UE receives second configuration information, the second configuration information including indication information of the target feedback delay indication value; determining the target feedback delay indication value based on the set of feedback delay indication values, includes: determining the target feedback delay indication value from the set of feedback delay indication values based on the indication information.

The base station further may indicate the target feedback delay indication value for the UE from the set of feedback delay indication values when sending the determined set of feedback delay indication values to the UE by sending the first configuration information to the UE, for example, when the base station determines that the set of feedback delay indication values of the UE is {71, 79, 87, 95, 103, 111, 119, 127}, the base station further may indicate 127 as a target feedback delay indication value of the UE, as another example, when the base station determines that the set of feedback delay indication values of the UE is (16, 22, 28, 24, 40, 46, 52, 58), the base station further may indicate 46 as a target feedback delay indication value of the UE.

In actual applications, the base station may indicate the target feedback delay indication value for the UE in the set of feedback delay indication values by sending second configuration information to the UE, and the base station may include indication information of the target feedback delay indication value in the second configuration information, and send the second configuration information to the UE, that is, the base station sends second configuration information, the second configuration information including indication information of the target feedback delay indication value. Correspondingly, the UE may determine a corresponding target feedback delay indication value from the set of feedback delay indication values of the UE based on the indication information of the target feedback delay indication value when receiving the second configuration information, that is, the indication information is configured to indicate determining the target feedback delay indication value from the set of feedback delay indication values.

In an example, the base station may include an index of the target feedback delay indication value in the second configuration information, that is, send an index of the target feedback delay indication value to the UE, for example, when the index in the second configuration information is 0, it represents that a first feedback delay indication value in the set of feedback delay indication values is determined as a target feedback delay indication value: as another example, when the index in the second configuration information is 1, it represents that a second feedback delay indication value in the set of feedback delay indication values is determined as a target feedback delay indication value, and so on, when the index in the second configuration information is 7, it represents that an eighth feedback delay indication value in the set of feedback delay indication values is determined as a target feedback delay indication value. Correspondingly, the UE determines a corresponding target feedback delay indication value from the set of feedback delay indication values of the UE based on the index when receiving the index of the target feedback delay indication value.

In actual application, the second configuration information may be DCI information, that is, the base station indicates indication information (for example, an index) of the target feedback delay indication value by sending the DCI information to the UE. Correspondingly, the UE receives DCI information sent by the base station and acquires the indication information, thereby determining the target feedback delay indication value from the set of feedback delay indication values based on the indication information.

Figure 3:
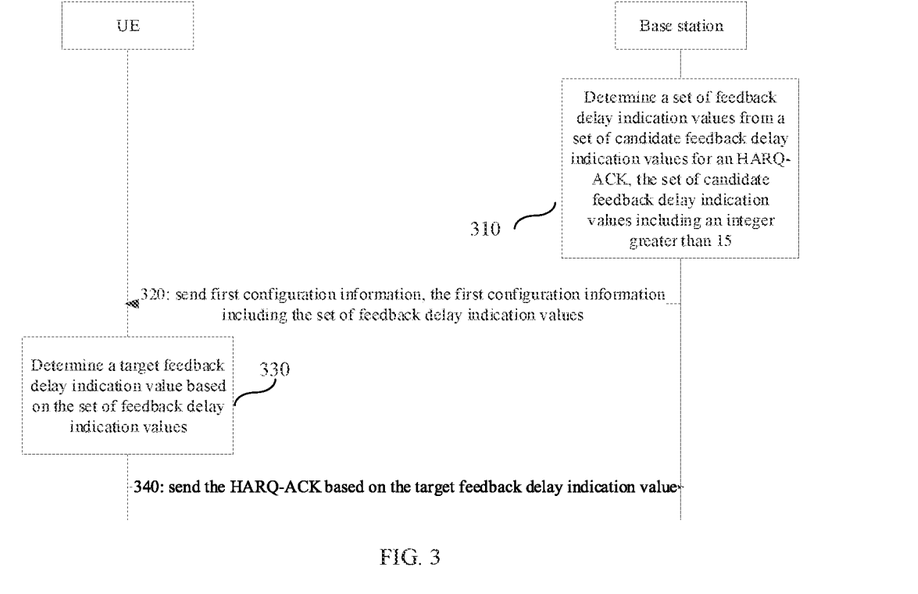
FIG. 3 is a diagram illustrating an interaction process between user equipment (UE) and a base station in an embodiment of the present disclosure.

FIG. 3 is a diagram illustrating an interaction process between user equipment (UE) and a base station in an embodiment of the present disclosure. As illustrated in FIG. 3, in step S310, the base station determines a set of feedback delay indication values from a set of candidate feedback delay indication values for an HARQ-ACK, the set of candidate feedback delay indication values including an integer greater than 15; in step S320, first configuration information is sent, the first configuration information including the set of feedback delay indication values, and the first configuration information may be RRC signaling information: in step S330, the UE determines a target feedback delay indication value based on the set of feedback delay indication values; and in step S340, the HARQ-ACK is sent based on the target feedback delay indication value, that is, the UE sends the HARQ-ACK to the base station based on the target feedback delay indication value.

Figure 4:
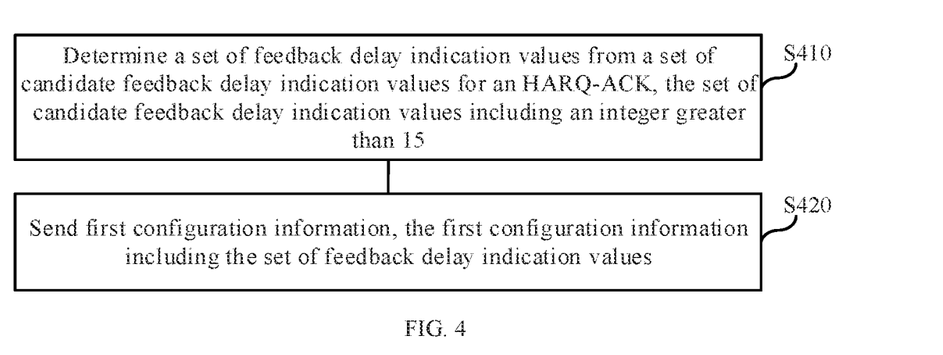
FIG. 4 is a flowchart illustrating a communication method in another embodiment of the present disclosure.

A communication method is provided in another embodiment of the present disclosure. The method is applied to a wireless communication system as illustrated in FIG. 1 and is performed by the base station 120 as illustrated in FIG. 1. As illustrated in FIG. 4, the method includes: determining a set of feedback delay indication values from a set of candidate feedback delay indication values for an HARQ-ACK, the set of candidate feedback delay indication values including an integer greater than 15; and sending first configuration information, the first configuration information including the set of feedback delay indication values.

In a possible implementation, the method further includes: receiving the HARQ-ACK sent by user equipment (UE) based on a target feedback delay indication value. The target feedback delay indication value is determined by the UE from the set of feedback delay indication values.

In a possible implementation, the method further includes: sending second configuration information, the second configuration information including indication information of the target feedback delay indication value; the indication information is configured to indicate the UE to determine the target feedback delay indication value from the set of feedback delay indication values.

In a possible implementation, the set of candidate feedback delay indication values includes sets of candidate feedback delay indication values corresponding to related information of different UEs; determining the set of feedback delay indication values from the set of candidate feedback delay indication values for the HARQ-ACK, includes: determining a corresponding set of candidate feedback delay indication values based on the related information of the UE: and determining the set of feedback delay indication values from the corresponding set of candidate feedback delay indication values.

In a possible implementation, the set of candidate feedback delay indication values includes subsets of candidate feedback delay indication values corresponding to related information of different UEs: determining the set of feedback delay indication values from the set of candidate feedback delay indication values for the HARQ-ACK, includes: determining a corresponding subset of candidate feedback delay indication values based on the related information of the UE; and determining the set of feedback delay indication values from the corresponding subset of candidate feedback delay indication values.

In a possible implementation, the method further includes: determining a number of feedback delay indication values included in the set of feedback delay indication values based on the related information of the UE.

In a possible implementation, the related information includes at least one of: a subcarrier spacing (SCS) of an uplink active carrier of the UE; a subcarrier spacing (SCS) of a downlink active carrier of the UE; and capability information of the UE.

In a possible implementation, the quantities of feedback delay indication values in the sets of feedback delay indication values corresponding to related information of different UEs are identical or different.

It should be noted that, the communication method at a base station side provided in embodiments of the present disclosure corresponds to the communication method at UE side provided in embodiments of the present disclosure, Consequently, it may be understood that processing steps of the communication method at the base station side correspond to steps of the communication method at the UE side, which will not be repeated here. The descriptions of the corresponding steps of the communication method at the UE side may refer to corresponding descriptions in the previous text.

In the communication method in embodiments of the present disclosure, the set of candidate feedback delay indication values includes an integer greater than 15, so that the feedback delay indication value in the set of feedback delay indication values may be set to a numerical value greater than 15, thereby providing the UE with more slots for demodulation of the PDSCH and generation of the HARQ-ACK information, increasing a duration of the feedback delay of the UE, and ensuring that the UE may effectively complete demodulation of the PDSCH and generation of the HARQ-ACK information.

Figure 5:
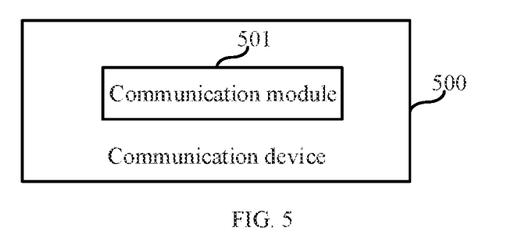
FIG. 5 is a diagram illustrating a basic structure of a communication device in another embodiment of the present disclosure.

FIG. 5 is a diagram illustrating a structure of a communication device in another embodiment of the present disclosure: as illustrated in FIG. 5, the communication device may achieve the function of UE or a component of the UE. The communication device 500 may include a communication module 501. The communication module 501 is configured to receive first configuration information: the first configuration information includes a set of feedback delay indication values for an HARQ-ACK. The set of feedback delay indication value is subset of a set of candidate feedback delay indication values for the HARQ-ACK. The set of candidate feedback delay indication values includes an integer greater than 15.

In a possible implementation, the communication device further includes a processing module: the processing module is configured to: determine a target feedback delay indication value based on the set of feedback delay indication values, and send the HARQ-ACK based on the target feedback delay indication value.

In a possible implementation, the communication module is further configured to receive second configuration information, the second configuration information including indication information of the target feedback delay indication value: the processing module is configured to determine the target feedback delay indication value from the set of feedback delay indication values based on the indication information in response to determining the target feedback delay indication value based on the set of feedback delay indication values.

In a possible implementation, the set of candidate feedback delay indication values includes sets of candidate feedback delay indication values corresponding to related information of different user equipment (UEs); the set of feedback delay indication values is a subset of the set of candidate feedback delay indication values corresponding to the related information of the UE.

In a possible implementation, the set of candidate feedback delay indication values includes subsets of candidate feedback delay indication values corresponding to related information of different UEs; the set of feedback delay indication values is a subset of the subset of candidate feedback delay indication values corresponding to the related information of the UE.

In a possible implementation, a number of feedback delay indication values in the set of feedback delay indication values corresponds to the related information of the UE.

In a possible implementation, the related information includes at least one of: a subcarrier spacing (SCS) of an uplink active carrier of the UE; a subcarrier spacing (SCS) of a downlink active carrier of the UE; and capability information of the UE.

In the communication device in embodiments of the present disclosure, the set of candidate feedback delay indication values includes an integer greater than 15, so that the feedback delay indication value in the set of feedback delay indication values may be set to a numerical value greater than 15, thereby providing the UE with more slots for demodulation of the PDSCH and generation of the HARQ-ACK information, increasing a duration of the feedback delay of the UE, and ensuring that the UE may effectively complete demodulation of the PDSCH and generation of the HARQ-ACK information.

It needs to be noted that, the embodiment is an apparatus embodiment corresponding to the above method embodiment at the UE side, and may be implemented in combination with the above method embodiment at the UE side. Related technical details in the method embodiment at the UE side are still valid in the embodiment and will not be repeated here in order to reduce repetition. Correspondingly, the related technical details referred in the embodiment may be applied to the method embodiment at the UE side.

Figure 6:
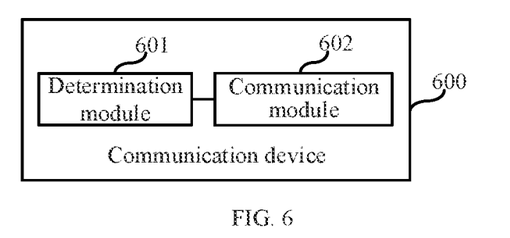
FIG. 6 is a diagram illustrating a basic structure of a communication device in another embodiment of the present disclosure.

FIG. 6 is a diagram illustrating a structure of a communication device in another embodiment of the present disclosure; as illustrated in FIG. 6, the communication device may achieve the function of a base station or a component of the base station. The communication device 600 may include a determination module 601 and a communication module 602. The determination module 601 is configured to determine a set of feedback delay indication values from a set of candidate feedback delay indication values for a hybrid automatic repeat request acknowledgment (HARQ-ACK), the set of candidate feedback delay indication values including an integer greater than 15; and the communication module 602 is configured to send first configuration information, the first configuration information including the set of feedback delay indication values.

In a possible implementation, the communication device further includes a processing module: the processing module is configured to receive the HARQ-ACK sent by user equipment (UE) based on a target feedback delay indication value. The target feedback delay indication value is determined by the UE from the set of feedback delay indication values.

In a possible implementation, the communication module is further configured to send second configuration information, the second configuration information including indication information of the target feedback delay indication value: the indication information is configured to indicate the UE to determine the target feedback delay indication value from the set of feedback delay indication values.

In a possible implementation, the set of candidate feedback delay indication values includes sets of candidate feedback delay indication values corresponding to related information of different user equipment (UEs); in response to determining the set of feedback delay indication values from the set of candidate feedback delay indication values for the HARQ-ACK, the determination module is configured to: determine a corresponding set of candidate feedback delay indication values based on the related information of the UE; and determine the set of feedback delay indication values from the corresponding set of candidate feedback delay indication values.

In a possible implementation, the set of candidate feedback delay indication values includes subsets of candidate feedback delay indication values corresponding to related information of different UEs; in response to determining the set of feedback delay indication values from the set of candidate feedback delay indication values for the HARQ-ACK, the determination module is configured to: determine a corresponding subset of candidate feedback delay indication values based on the related information of the UE; and determine the set of feedback delay indication values from the corresponding subset of candidate feedback delay indication values.

In a possible implementation, the determination module is further configured to determine a number of feedback delay indication values included in the set of feedback delay indication values based on the related information of the UE.

In a possible implementation, the related information includes at least one of: a subcarrier spacing of an uplink active carrier of the UE; a subcarrier spacing of a downlink active carrier of the UE: and capability information of the UE.

In a possible implementation, the quantities of feedback delay indication values in the sets of feedback delay indication values corresponding to related information of different UEs are identical or different.

In the communication device in embodiments of the present disclosure, the set of candidate feedback delay indication values includes an integer greater than 15, so that the feedback delay indication value in the set of feedback delay indication values may be set to a numerical value greater than 15, thereby providing the UE with more slots for demodulation of the PDSCH and generation of the HARQ-ACK information, increasing a duration of the feedback delay of the UE, and ensuring that the UE may effectively complete demodulation of the PDSCH and generation of the HARQ-ACK information.

It needs to be noted that, the embodiment is an apparatus embodiment corresponding to the above method embodiment at the base station side, and may be implemented in combination with the above method embodiment at the base station side. Related technical details in the method embodiment at the base station side are still valid in the embodiment and will not be repeated here in order to reduce repetition. Correspondingly, the related technical details referred in the embodiment may be applied to the method embodiment at the base station side.

Figure 7:
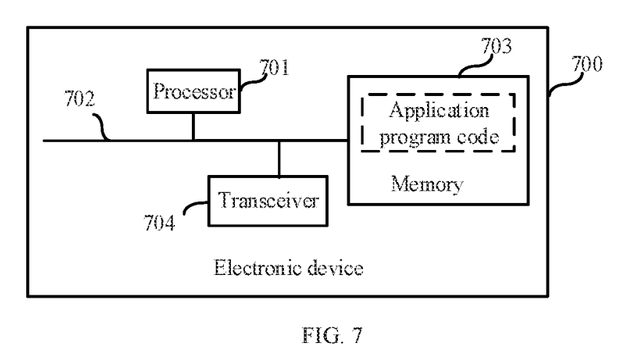
FIG. 7 is a diagram illustrating a structure of an electronic device in another embodiment of the present disclosure.

An electronic device is provided in another embodiment of the present disclosure; as illustrated in FIG. 7, an electronic device 700 includes a processor 701 and a memory 703. The processor 701 is coupled to the memory 703, such as by a bus 702. Furthermore, the electronic device 700 may further include a transceiver 704. It needs to be noted that, the transceiver 704 in the actual application is not limited to one, and the structure of the electronic device 700 does not constitute a limitation of embodiments of the present disclosure.

The processor 701 is applied to embodiments of the present disclosure, and configured to achieve the function of the receiving module as illustrated in FIG. 5 or achieve the function of the determination module or the sending module as illustrated in FIG. 6. The transceiver 704 includes a receiver and a transmitter.

The processor 701 may be a CPU, a universal processor, a DSP, an ASIC, an FPGA or other programmable logic device, a transistor logic device, a hardware component or any combination thereof. The processor may implement or execute various exemplary logical boxes, modules, and circuits described in conjunction with the contents in the present disclosure. The processor 701 may be a combination that achieves a computation function, for example, a combination of one or more microprocessors, a combination of a DSP and a microprocessor, etc.

The bus 702 may include a path where information is transmitted between the above components. The bus 702 may be a PCI bus or an EISA bus or the like. The bus 702 may be divided into an address bus, a data bus, a control bus, etc. For ease of representation, only one thick line is used to represent the bus in FIG. 7, but does not represent that there is only one bus or one type of bus.

The memory 703 may be a ROM or other types of static storage devices that may store static information and instructions, a RAM or other types of dynamic storage devices that may store information and instructions, an EEPROM, a CD-ROM or other disc memory, a disc memory (including a compact disc, a laser disc, an optical disc, a universal digital disc, a Blu-ray disc, etc.), a disk storage medium, or other magnetic storage devices, or any other medium that may be used to carry or store desired program codes in the form of instructions or data structures and that may be accessed by a computer, which is not limited here.

The memory 703 is configured to store application program codes that executes the solution in the present disclosure, and is controlled to be executed by the processor 701. The processor 701 is configured to execute the application program codes stored in the memory 703 to implement the action of the communication device provided in the embodiment as illustrated in FIG. 5 or FIG. 6.

The electronic device provided in the embodiments of the present disclosure includes a memory, a processor, and a computer program stored in the memory and executable by the processor, and w % ben the processor executes the program, the following two aspects of functions may be implemented:

In one aspect, first configuration information is received: the first configuration information includes a set of feedback delay indication values for the HARQ-ACK, the set of feedback delay indication value is subset of a set of candidate feedback delay indication values for the HARQ-ACK, and the set of candidate feedback delay indication values includes an integer greater than 15.

In another aspect, a set of feedback delay indication values is determined from the set of candidate feedback delay indication values for the HARQ-ACK, the set of candidate feedback delay indication values including an integer greater than 15; and first configuration information is sent, the first configuration information including the set of feedback delay indication values.

A computer readable storage medium with a computer program stored thereon is provided in embodiments of the present disclosure. The program performs the above method as described in the above embodiment w % ben executed by a processor. The set of candidate feedback delay indication values includes an integer greater than 15, so that the feedback delay indication value in the set of feedback delay indication values may be set to a numerical value greater than 15, thereby providing the UE with more slots for demodulation of the PDSCH and generation of the HARQ-ACK information, increasing a duration of the feedback delay of the UE, and ensuring that the UE may effectively complete demodulation of the PDSCH and generation of the HARQ-ACK information.

The computer readable storage medium provided in embodiments of the present disclosure is applicable to any one embodiment in the above method.

It should be understood that although steps in the flowchart of the attached drawings are sequentially displayed based on the indication of the arrows, these steps are not necessarily executed in the sequence indicated by the arrows. Unless explicitly stated herein, these steps are not executed in a strict sequence, and may be executed in other sequences. And, at least some of steps in the flowchart of the attached drawings may include a plurality of sub-steps or a plurality of stages, these sub-steps or stages are not necessarily executed at the same moment, but may be executed at different moments, and the execution sequence thereof is also not necessarily performed in sequence, but may be performed in turn or alternately with at least one part of other steps or sub-steps of other steps or stages.

The foregoing description involves some of embodiments of the present disclosure. It should be noted that, for those skilled in the art, several improvements and modifications may be made without departing from the principles of the present disclosure, and these improvements and modifications are also considered to be within the protection scope of the present disclosure.

The invention claimed is:

1. A communication method, comprising:
receiving first configuration information,
wherein the first configuration information comprises a set of feedback delay indication values for a hybrid automatic repeat request acknowledgment, the set of feedback delay indication values is a subset of a set of candidate feedback delay indication values for the hybrid automatic repeat request acknowledgment, and the set of candidate feedback delay indication values comprises an integer greater than 15; wherein the set of candidate feedback delay indication values comprises subsets of candidate feedback delay indication values corresponding to related information of different user equipment.

2. The communication method according to claim 1, further comprising:
determining a target feedback delay indication value based on the set of feedback delay indication values; and
sending the hybrid automatic repeat request acknowledgment based on the target feedback delay indication value.

3. The communication method according to claim 2, further comprising:
receiving second configuration information, the second configuration information comprising indication information of the target feedback delay indication value,
wherein determining a target feedback delay indication value based on the set of feedback delay indication values comprises:
determining the target feedback delay indication value from the set of feedback delay indication values based on the indication information.

4. The communication method according to claim 1, wherein the related information comprises at least one of: a subcarrier spacing of an uplink active carrier of the user equipment; a subcarrier spacing of a downlink active carrier of the user equipment; and capability information of the user equipment.

5. The communication method according to claim 1, wherein the set of feedback delay indication values is a subset of the subset of candidate feedback delay indication values corresponding to the related information of the user equipment.

6. The communication method according to claim 1, wherein a number of feedback delay indication values in the set of feedback delay indication values corresponds to the related information of the user equipment.

7. A communication method, comprising:
determining a set of feedback delay indication values from a set of candidate feedback delay indication values for a hybrid automatic repeat request acknowledgment, the set of candidate feedback delay indication values comprising an integer greater than 15; and
sending first configuration information, the first configuration information comprising the set of feedback delay indication values;
wherein the set of candidate feedback delay indication values comprises subsets of candidate feedback delay indication values corresponding to related information of different user equipment.

8. The communication method according to claim 7, wherein quantities of feedback delay indication values in the sets of feedback delay indication values corresponding to different related information are identical or different.

9. The communication method according to claim 7, further comprising:
receiving the hybrid automatic repeat request acknowledgment sent by user equipment based on a target feedback delay indication value, wherein the target feedback delay indication value is determined by the user equipment from the set of feedback delay indication values.

10. The communication method according to claim 9, further comprising:
sending second configuration information, the second configuration information comprising indication information of the target feedback delay indication value,
wherein the indication information is configured to indicate the user equipment to determine the target feedback delay indication value from the set of feedback delay indication values.

11. The communication method according to claim 7, wherein the related information comprises at least one of: a subcarrier spacing of an uplink active carrier of the user equipment; a subcarrier spacing of a downlink active carrier of the user equipment; and capability information of the user equipment.

12. The communication method according to claim 7, wherein determining a set of feedback delay indication values from a set of candidate feedback delay indication values for a hybrid automatic repeat request acknowledgment comprises:
   determining a corresponding subset of candidate feedback delay indication values based on the related information of the user equipment; and
   determining the set of feedback delay indication values from the corresponding subset of candidate feedback delay indication values.

13. The communication method according to claim 7, further comprising:
   determining a number of feedback delay indication values in the set of feedback delay indication values based on the related information of the user equipment.

14. An electronic device, comprising:
   a processor; and
   a memory storing a computer program executable by the processor, wherein the processor is configured to:
      receive first configuration information,
   wherein the first configuration information comprises a set of feedback delay indication values for a hybrid automatic repeat request acknowledgment, the set of feedback delay indication values is a subset of a set of candidate feedback delay indication values for the hybrid automatic repeat request acknowledgment, and the set of candidate feedback delay indication values comprises an integer greater than 15; wherein the set of candidate feedback delay indication values comprises subsets of candidate feedback delay indication values corresponding to related information of different user equipment.

15. The electronic device according to claim 14, wherein the processor is further configured to:
   determine a target feedback delay indication value based on the set of feedback delay indication values; and
   send the hybrid automatic repeat request acknowledgment based on the target feedback delay indication value.

16. The electronic device according to claim 15, wherein the processor is further configured to:
   receive second configuration information, the second configuration information comprising indication information of the target feedback delay indication value,
   wherein in determining the target feedback delay indication value based on the set of feedback delay indication values, the processor is further configured to:
      determine the target feedback delay indication value from the set of feedback delay indication values based on the indication information.

17. The electronic device according to claim 14, wherein the set of feedback delay indication values is a subset of the subset of candidate feedback delay indication values corresponding to the related information of the user equipment.

* * * * *